March 15, 1960     D. GUTMAN     2,928,691
PEDESTRIAN PROTECTIVE DEVICE
Filed Feb. 21, 1955     3 Sheets-Sheet 1
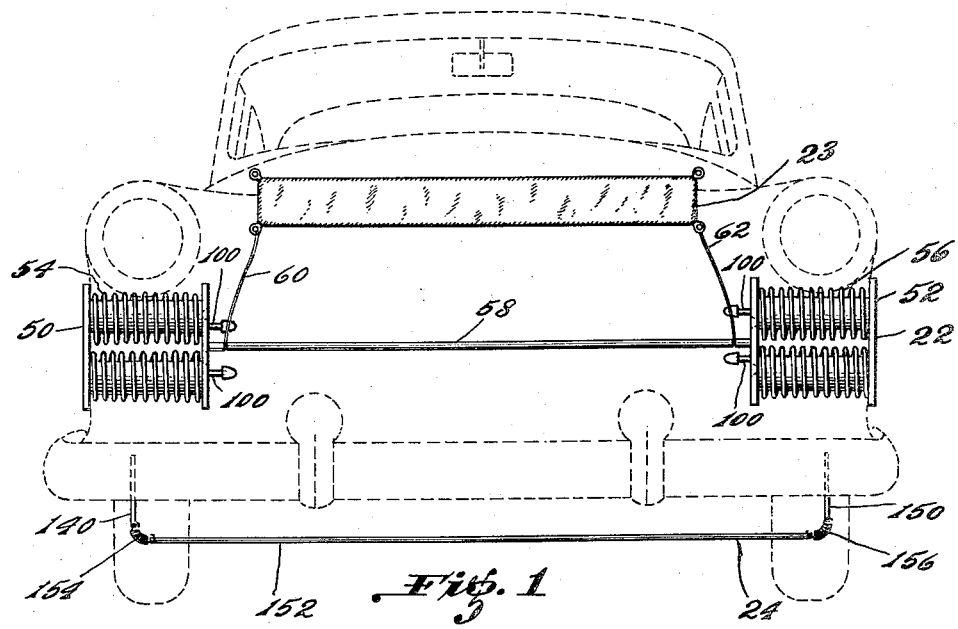
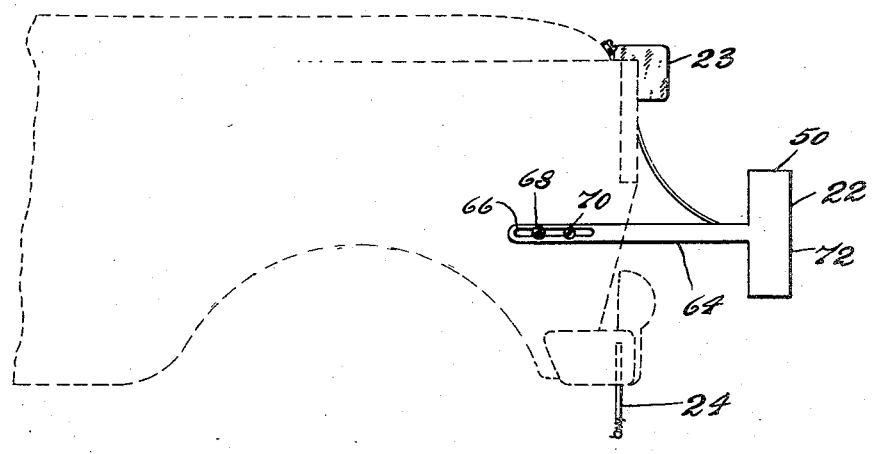
INVENTOR
David Gutman
BY Wm. Steell Jackson and Son
ATTORNEY March 15, 1960 D. GUTMAN 2,928,691
PEDESTRIAN PROTECTIVE DEVICE
Filed Feb. 21, 1955 3 Sheets-Sheet 2
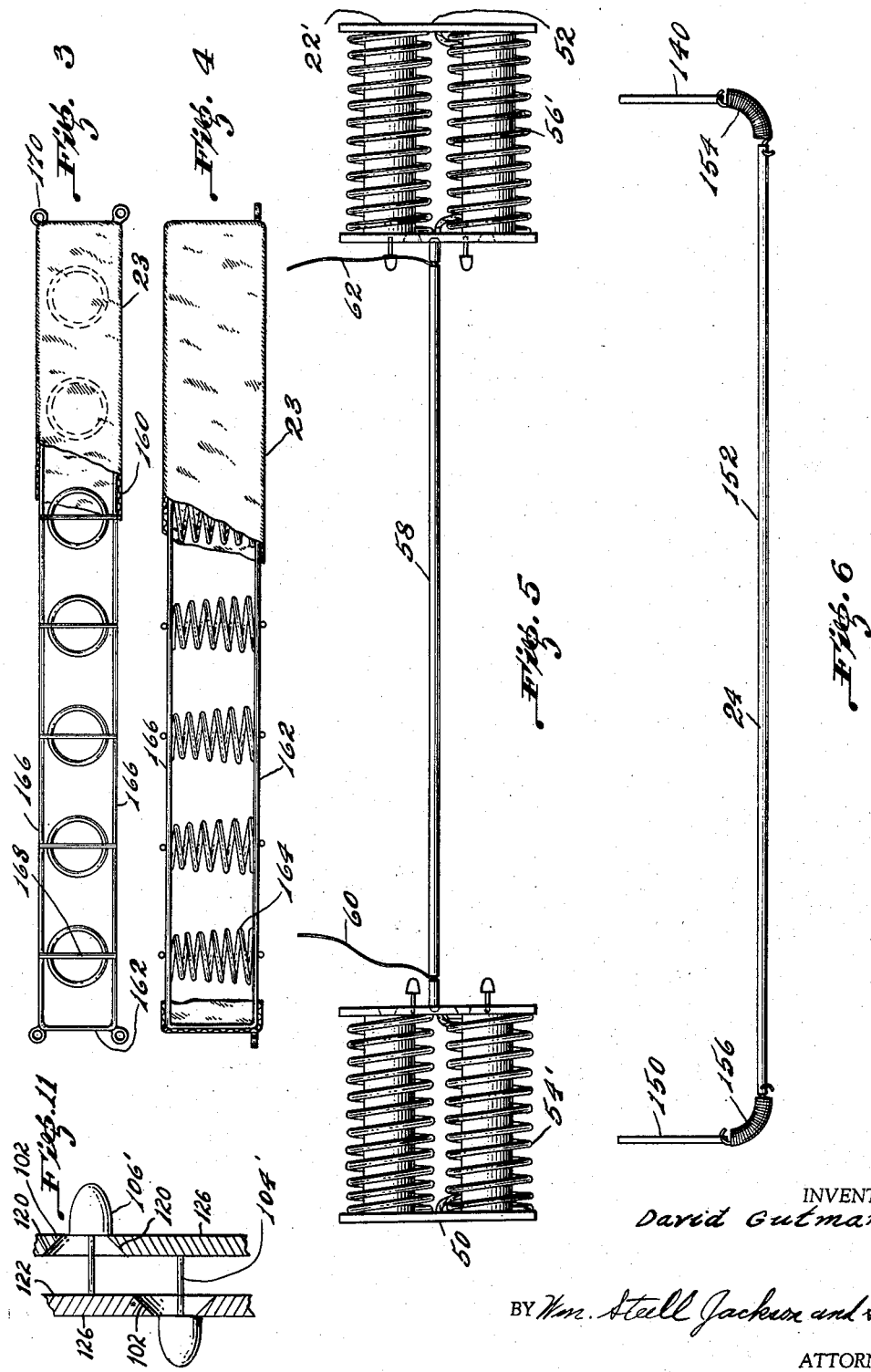
INVENTOR
David Gutman
BY *Wm. Steell Jackson and Sons*
ATTORNEYS March 15, 1960
D. GUTMAN
2,928,691
PEDESTRIAN PROTECTIVE DEVICE
Filed Feb. 21, 1955
3 Sheets-Sheet 3
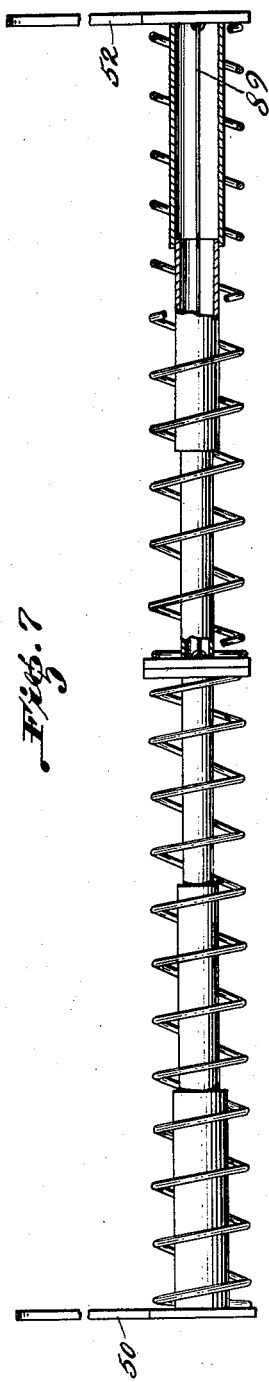
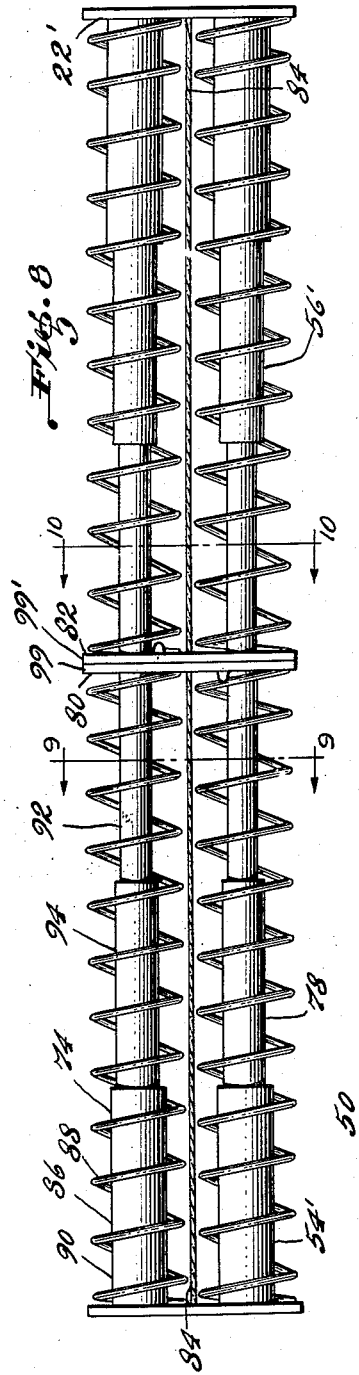
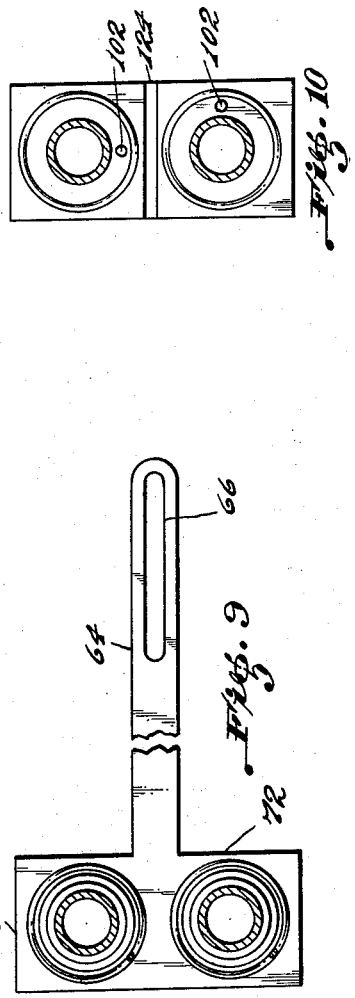
INVENTOR
David Gutman
BY *Wm. Steell Jackson and Sons*
ATTORNEYS United States Patent Office 2,928,691
Patented Mar. 15, 1960

2,928,691

PEDESTRIAN PROTECTIVE DEVICE

David Gutman, Philadelphia, Pa.

Application February 21, 1955, Serial No. 489,685

3 Claims. (Cl. 293—16)

The present invention relates to a device for protecting pedestrians who are hit by automobiles or other vehicles.

A purpose of the invention is to protect such pedestrians from injury in such cases.

A further purpose of the invention is to reduce the force and effect of the blow struck by the automobile or other vehicle if and when it hits the pedestrian.

A further purpose of the invention is to catch the pedestrian and prevent him from falling backward on the street after he has been struck by the automobile or other vehicle.

A further purpose of the invention is to prevent the pedestrian from injuring his feet or legs upon the edge of the automobile bumper.

A further purpose of the invention is to provide a device which, when the pedestrian is hit by the front of an automobile, will establish a secure protective barrier behind the thighs of the pedestrian, preventing him from falling backward upon the street.

A further purpose of the invention is to provide a locking member for two elements which are originally spaced a considerable distance apart, and which on coming together will lock securely against coming apart under transverse stress.

Further purposes appear in the remainder of the specification and claims.

In the invention I have chosen to illustrate one only, with certain variations, of the numerous embodiments in which my invention may occur, selecting the forms shown from the standpoint of convenience in illustration, satisfactory operation and clear demonstration of the principles involved.

Figure 1 is a front view of an embodiment of my invention as applied to the front of an automobile.

Figure 2 is a side view of the same embodiment thus employed.

Figure 3 is an enlarged front view of the cushioning device of my invention, broken away.

Figure 4 is an enlarged top view of the same cushioning device, broken away.

Figure 5 is an enlarged front view of a somewhat variant form of the holding device of my invention.

Figure 6 is an enlarged front view of the ankle protective device of my invention.

Figure 7 is an enlarged top view of the holding device of my invention, broken away, shown in the closed rather than, as previously, in the open position.

Figure 8 is an enlarged front view of the holding device of my invention as found in Figure 5, but again in the closed position rather than the open.

Figure 9 is an enlarged cross section of Figure 8 along the line 9—9, not showing the ropes.

Figure 10 is an enlarged cross section of Figure 8 along the line 10—10, showing only the locking device and associated parts not including the ropes and not showing the supporting device beyond.

Figure 11 is an enlarged vertical section broken away, through part of a form of the locking device in closed position.

Describing in illustration but not in limitation and referring to the drawings:

My device has three main parts: A holding device 22 or 22'; a cushioning device 23; and an ankle protective device 24 intended to protect the feet and legs of the person and also generally to cooperate with the rest of the device.

The holding device 22 or 22', as shown especially in Figure 5 and Figures 7 through 11, as well as Figures 1 and 2, consists of end support members 50 and 52, one at either end, and extensible structures 54 or 54' and 56 or 56', on either side, which will normally be held apart by trigger stick 58 which is attached to the cushioning device 23 by cords 60 and 62.

End supports 50 and 52 in each case have arm 64 with slot 66 toward the end thereof, in which bolts 68 and 70 can be inserted to hold it on to the fender of the car. Preferably, the slot will be reasonably long, and the bolts will both be put in at intermediate points in the slot rather than at either end, so that under severe stress the support can move somewhat in either direction against the friction exerted by the bolt head, before he bolt reaches the end of the slot. At the other end of the arm 64 is support head 72, giving the support a more or less T-shaped general outline. If desired, arm 64 can be staggered rather than straight, so that support head 72 will be further out than the side of the auto, rather than more or less in line with the side.

Extensible structures 54 or 54' and 56 or 56' consist in each case of two telescopic assemblies, an upper one 74 and a lower one 78 below it, together with an end joining member 80 on the left in the figure and 82 on the right respectively. In the form of Figures 5 and 8, unlike the form of Figure 1, there is also in each case a rope 84, preferably of nylon, intermediate between the upper and lower telescopic assemblies, fastened by any suitable means at one end to the end support member such as 50 and at the other end to the end joining member of that particular extensible structure, such as 80.

Each telescopic assembly consists of a nest 86 of telescoping tubes, a compression spring 88 surrounding the nest, and a rope 89 preferably of nylon, within the nest. The telescoping tubes fit one within another and are somewhat tapered in the direction in which they are to be extended, so that they will not come completely apart. The largest, 90, is fastened by any suitable means at its large end to the end support which is on that side of the auto, and the smallest, 92, is fastened by any suitable means at its small end to the end joining member which forms part of the same extensible member, such as 80 in the case of the extensible member shown on the left. In the form shown there is an intermediate telescoping member 94. It may be advantageous in some instances to have still another intermediate telescoping member so that when the device is fully telescoped it occupies a shorter length.

In the form shown in the drawings, for the sake of simplicity the telescoping members are of metal and the largest and smallest are joined to the respective end plates by welding, which is a satisfactory form. However, the telescoping members are preferably made of plastic, and in such case can be joined to the end plates by putting holes in those end plates into which the end of the plastic tube will fit tightly and preferably then putting a metal disk or washer to fit tightly inside the end of the plastic tube. Compression spring 88 is located around the telescoping members, and preferably welded at the one end to the end support such as 50 and at the other end to the end joining member such as 80. Inside of the telescoping members and joined to the end support member and end joining member respectively by suitable means, is rope 89 in each case, preferably of some material such as nylon.

The end joining members such as 80 and 82 respectively, as shown in Figures 1, 8 and 10, with detail in Figure 11, are plates 99 and 99' of approximately the same size as the head of the T of the support member, but each one having two lock fingers 100 positioned exactly to meet corresponding respective holes 102 in the opposite end joining member. Lock fingers 100 are each made up of wire 104', preferably of about No. 14 gauge, and, attached at the end of the wire, enlarged rounded-end head 106'. The head, which is circular in cross-section and starts off more or less cylindrical at the base and then gradually curves inward to a blunt tip, preferably has a flat bottom, so that the outline of the finger contracts in sharply perpendicular fashion at the base of the head. Holes 102 have conically sloping sides 120, so that the interior of the hole is in the shape of a frustum of a cone. The wide end of each hole faces toward the opposing plate and its wire and rounded-end head. The narrow end of the hole is just wide enough to permit the base or large end of rounded-end head 106' to go completely through and come out beyond it.

Across the middle of the face, 122, of plate 99 which faces the opposing plate is a horizontal groove 124 for the end of the trigger.

As shown in Figure 11, the length of wire 104' may be several times the thickness of the plate 99. On the other hand, if desired, the wire may instead be just long enough to permit head 106' to go completely through the hole and come out beyond it, as shown in Figure 8.

If desired in order to increase the strength of the locking device, the hole, instead of being conical throughout, could at the small end by cylindrical.

In such case, the flaring could start—permissibly at much the same angle as shown in the drawing—at a substantial distance from the small end of the hole, such as at a point one quarter or half way through the plate from the small end.

When trigger 58 is removed from between the two extensible devices the two come together under the influence of the coil springs and the heads 106' go into their respective holes 102 and through until the bases of the heads are beyond the other face 126 of the plate. Wire 104' is of such a gauge as to permit lateral displacement of the head in case of any inexactitude of registry between pointed head and hole, though not to permit free and unlimited bending at the point where the wire meets the head. Once the head is all the way through the hole, it will, especially if subjected to any lateral pressure, tend to upset any registry previously secured, and thus to overlap plate face 126 at one point or another, and thus the two plates will be locked together.

Ropes 84 and 89 are in each case of a length such as to be substantially taut or nearly so when the plates 99 come together. Preferably, however, the three such ropes in any one of the two extensible structures in the form of Figure 5 will be slightly different in length from each other so that while the shortest will be just about taut when the plates are locked together, the next shortest will be a little slacker and the longest still slacker.

When the holding device is in telescoped position, rope 84 can be tucked into the spring to hold it up.

Ankle guard 24 consists of vertical support wires 140 and 150, lateral wire 152, and curved coil springs 154 and 156 connecting the lateral wire to the respective support wires at each end. The support wire is attached to the bumper toward the end thereof in each case and extends downward, and the lateral wire 152 thus extends across from in front of one wheel to the front of the other at a point below the bumper.

The cushion device 23 as shown especially in Figures 3 and 4, has an outline more or less like that of an elongated rectangular box. Inside of cover 160, which is made of any suitable plastic, fabric or other material, is wire framework 162 and coil compression springs 164. Wire framework 162 consists of edge wires 166 running along the twelve edges of the box structure, together with intermediate vertical wires 168 positioned front and back at corresponding places along the long dimension of the cushion device. Coil springs 164 each extend horizontally between a different pair of these intermediate wires. At each of the four rear corners of the cushion device is a tab 170.

The cushion device is placed with its long dimension stretching across the upper front of the hood of the automobile, to which it is attached by any suitable means, as by bolting through the tabs. The coil springs will be directed longitudinally of the car, and the front of the cushioning device will be somewhat forward of the bumper, so that the cushioning device can serve to cushion the contact of a pedestrian with the front of the car.

In operation, if a pedestrian is hit by the front of the car, his body, after knocking out trigger 58, comes in contact with cushion 23. The springs of said cushion contract and the force of the initial bump is greatly reduced, the pedestrian thus being much less liable to severe injury thereby. The ankle guard may cooperate at this time to prevent injury to the pedestrian's feet or legs. Before his body has a chance to fall back out onto the street the holding device will have come into play, springs 88 pushing the extensible members toward each other so that they bring the end joining plates together at a point more or less behind the pedestrian's thigh. As the pedestrian goes back, recoiling from the effect of the contact with cushion member 23, his thighs will come back against the holding member and prevent him from going further backward. The holding member has in the meantime locked, and if anything further is required the lateral push by the pedestrian completes the locking process.

The whole structure of the holding member cooperates to prevent any great further backward movement by the pedestrian, yet to stop the backward movement somewhat gradually. The end structure 50 may pull backward along the slot somewhat but then the nuts come to the end of the slot and the end structure is firmly held. The nylon ropes securely hold between the end support and the locked plates in the middle. The springs furnish supplementary support. The arrangement by which the nylon ropes are of slightly varying lengths helps to create a condition in which the pedestrian's movement away from the car is not stopped suddenly and violently all at once, but gradually. If by any chance the force involved should exceed the strength of one or more of the ropes, it or they can break and still there will be the support of other rope or ropes or the spring to prevent the pedestrian from falling to the street. The telescoping tubes, while they will add somewhat to the strength of the device, are preferably not intended to be a main reliance in this respect, but rather to be relatively light in construction so that the inertia of the extensible structure will not be great, and the structure will be relatively quickly and easily extended by the spring when the trigger is released. However, the telescoping tubes must be sufficiently sturdy, tight and exact in construction to reliably secure sufficient registry between the locking fingers and their respective holes on closure of the holding device to enable locking to take place. Adjustment in installation in connection with securing registry can be had by means of the bolts in the end support devices. The arrangement of these bolts also makes it possible for the end support device and extensible structure associated therewith to move backward somewhat without breaking in case of a light bump by that corner of the auto against another auto or an obstruction. Considering, from the overall standpoint, the action of the holding device in holding the pedestrian when he comes back with especial force, we thus have this situation:

When the pedestrian first comes in contact with the holding device in its preferred form, he hits the plastic telescoping tubes and these give and crumple somewhat, partly breaking the force of the blow. The nylon ropes which are strong and elastic and are the main reliance in holding, then come into play. Any slack there may be in the shortest is first taken up and then the nylon rope gradually begins taking up the remaining impact, stretching as it does. When this builds up to a sufficient point, the end supports 50 and 52 pull forwardly against the friction of the bolt head in the slot, until the bolt hits the end of the slot, this action against the friction of the bolt head still further taking up the force of the blow. At the end of this, the shortest rope stretches still further and either before or after this, the other ropes gradually come into play, becoming taut and stretching to still further resist the backward movement of the pedestrian. Thus a very decided and important cushioning effect is secured.

At the same time as the pedestrian is held from going backward by the holding device, the ankle guard 24 operates to hold his feet from any extreme upward movement and to do so without injury from banging his feet or legs against the bottom of the bumper. The springs 154 and 156 between the lateral member and the vertical support members stretch to allow sufficient play so that the pedestrian is not hurt by his contact with the ankle guard itself.

If it is so desired, my device can also be placed on the back of the auto or other vehicle, extending toward the rear, to protect the pedestrian from injury by being hit by the vehicle when it is backing.

The term "telescopic tube," as used in the claims herein, is defined as a nest of members telescoping together. A single "telescopic tube," as thus used, is a single such nest and includes a plurality of members in telescoping relation.

In view of my invention and disclosure variations and modifications to meet individual whim or particular need will doubtless become evident to others skilled in the art, to obtain all or part of the benefits of my invention without copying the structure shown, and I, therefore, claim all such insofar as they fall within the reasonable spirit and scope of my claims.

Having thus described my invention what I claim as new and desire to secure by Letters Patent is:

1. A pedestrian protective device for a vehicle, comprising two straight telescopic tubes, a first mounting means supporting the first said tube by one end of the tube, hereinafter denoted the outer as disinguished from the inner end, the mounting means being adapted to mount the tube on the vehicle in front of one side of the front of the vehicle at a distance more than a person's body thickness in front thereof and at a level above the bumper, a second mounting means supporting the second said tube by one end of the tube, hereinafter denoted the outer as distinguished from the inner end, the second mounting means being adapted to mount the second tube on the vehicle in front of the other side of the front of the vehicle at a distance more than a person's body thickness in front thereof and at a level above the bumper, the two tubes having a common longitudinal axis which extends horizontally across between the two mounting means, and said tubes having a contracted position in which their inner ends are more than a person's body width apart and an extended position in which said ends are close together, means tending to urge the tubes into extended position, means adapted to hold them in contracted position against this urge unless and until a pedestrian passes in between said tubes, a finger on the inner end of one of said tubes pointing toward the other of said tubes and having an enlarged head, and, on the inner end of the other of said tubes, substantially rigid walls forming a hole of substantially fixed size which hole is in registry with said finger and adapted to receive it when the tubes come into closed position and thereafter retain it in locked relationship under lateral stress by the pedestrian, said hole having dimensions in every direction perpendicular to its longitudinal axis which are at all times at least substantially as large as the respective dimensions of the head in the corresponding directions.

2. In combination, an automobile having two sides and a front which includes a front bumper and grillwork, two T-shaped mounting plates, one on each side of the automobile parallel to each other, each having a longitudinal slot in the foot of the leg of the T, bolt means for holding, located in the side of the automobile near the front and passing through the slot of each mounting plate at points spaced from the ends of said slot, the mounting plate toward its end toward the head of the T extending beyond the frontmost point of the rest of the automobile to a distance greater than a person's body thickness, and the bolt means being tight against the mounting plates with a tightness sufficient to hold the mounting plates in their original position with substantial frictional resistance by the bolts against movement of the mounting plates, but not sufficient to prevent the mounting plates from overcoming this frictional resistance and sliding longitudinally against such resistance in case of a collision affecting the mounting plate, a plurality of straight telescopic tubes, a pair of said tubes being mounted on the head of one mounting plate and a pair on the head of the other and each pair directed toward the other pair in a direction and position horizontally straight across in front of and spaced from the rest of the automobile by a distance greater than a person's body thickness, two rigid locking plates, one mounted on the end of one pair of tubes away from their mounting plate and the other mounted on the end of the other pair of tubes away from their mounting plate, and each having both a plurality of round rigid walled openings therethrough flaring toward the end toward the far side of the automobile and a plurality of fingers made up of circular in cross-section and rounded-end heads mounted on limitedly flexible necks with the head narrowing perpendicularly to the finger axis at the point where head and neck join, each said finger head on each locking plate being in registry with an opening in the other locking plate and the maximum cross-sectional diameter of each head being smaller than the minimum diameter across the opening in registry therewith when both head and opening are in normal unstressed condition, two sets of coil springs in compression, one extending between the mounting plate and the locking plate on one side of the automobile and the other between the mounting plate and the locking plate on the other side of the automobile and each set being attached to both its respective mounting plate and its respective locking plate and tending to push them apart, nylon ropes including a plurality having somewhat differing lengths extending between and attached to a given mounting plate head and the nearest locking plate, with the shortest of the plurality of ropes being just short of taut when the respective heads of fingers have just passed completely through the corresponding openings, and a trigger stick extending across between the two locking plates and releasably holding them apart, the straight tubes, two sets of springs, and locking plates being at all times more than a body's thickness from the front bumper and grillwork of the automobile, and the locking plates being further apart than a body's width when held apart by the trigger stick, and being substantially together when not so held apart.

3. A pedestrian protective device comprising two straight telescopic tubes, a first mounting means supporting the first said tube by one end of the tube, hereinafter denoted the outer as distinguished from the inner end, the mounting means being adapted to mount the tube on an auto in a position higher than the bumper and in front of a first side of the front of the auto at a distance greater than the thickness of a person's body from the front of the auto, a second mounting means supporting the second said tube by one end of the tube, hereinafter denoted the outer as distinguished from the inner end, the second mounting means being adapted to mount the second tube on the auto in a position in front of the other side of the front of the auto at the same distance from the front of the auto as is the first tube, the two tubes having a common longitudinal axis running horizontally across between the two mounting means, the said telescoping tubes each having a telescoped position in which the inner end of each is in the respective outermost quarter of the distance between the respective outer ends of the respective tubes, and an extended position in which the respective inner ends are close together, two compression springs, one mounted on one of the mounting means and the other on the other and each acting on the inner end of the tube mounted on its respective mounting means and urging said tube toward its extended position, a rod adapted to removably extend between the tubes in telescoped position and to hold them in that position against the force of the spring, a finger having an enlarged head, which finger is mounted on the inner end of one of the tubes and which finger extends in the direction of the other tube, and a plate mounted on the inner end of the said other tube which plate includes rigid walls forming a hole in registry with the finger, the edge of the walls of said hole which is toward the mounting means of said other tube being perpendicular to the longitudinal axis of the hole, said finger narrowing perpendicularly at the end of the head toward the mounting means on which its tube is mounted and the maximum distance through said head perpendicularly to the longitudinal axis thereof being at all times less than the minimum distance across the opening of said hole.

References Cited in the file of this patent

UNITED STATES PATENTS

| | | |
|---|---|---|
| 524,841 | Rumrell | Aug. 21, 1894 |
| 1,246,840 | Athanasopoulos | Nov. 20, 1917 |
| 1,804,032 | Rottman | May 5, 1931 |

FOREIGN PATENTS

| | | |
|---|---|---|
| 248,166 | Germany | Feb. 14, 1911 |
| 23,672 of 1904 | Great Britain | Sept. 7, 1905 |
| 29,996 of 1913 | Great Britain | Mar. 26, 1914 |
| 14,372 of 1915 | Great Britain | July 13, 1916 |
| 220,441 | Great Britain | Aug. 21, 1924 |